US007409363B2

(12) United States Patent
Hosaka

(10) Patent No.: US 7,409,363 B2
(45) Date of Patent: Aug. 5, 2008

(54) CENTRALIZED MANAGEMENT SYSTEM FOR MAINTENANCE PARTS

(75) Inventor: Yoshihiro Hosaka, Tokyo (JP)

(73) Assignee: Daifuku Co., Ltd., Osaka-Shi, Osaka (JP)

( * ) Notice: Subject to any disclaimer, the term of this patent is extended or adjusted under 35 U.S.C. 154(b) by 1089 days.

(21) Appl. No.: 10/624,354

(22) Filed: Jul. 21, 2003

(65) Prior Publication Data

US 2004/0044598 A1   Mar. 4, 2004

(30) Foreign Application Priority Data

Aug. 28, 2002   (JP) ............................. 2002-249199

(51) Int. Cl.
*G06Q 10/00* (2006.01)
(52) U.S. Cl. .......................................... 705/28; 705/27
(58) Field of Classification Search .................. 705/28, 705/27; 235/375
See application file for complete search history.

(56) References Cited

U.S. PATENT DOCUMENTS

| 5,216,612 | A | * | 6/1993 | Cornett et al. ............... 700/96 |
| 5,311,438 | A | * | 5/1994 | Sellers et al. ............... 700/96 |
| 2003/0172002 | A1 | * | 9/2003 | Spira et al. ................ 705/27 |

FOREIGN PATENT DOCUMENTS

| JP | 03-138206 A1 | 6/1991 |
| JP | 07-315527 A1 | 12/1995 |
| JP | 08-234809 A1 | 9/1996 |
| JP | 11-353366 A | 12/1999 |
| JP | 2001-225927 A | 8/2001 |
| JP | 2002-007597 A | 1/2002 |
| JP | 2002-137874 A | 5/2002 |
| JP | 2002-170011 A | 6/2002 |
| JP | 2002-182728 A | 6/2002 |

OTHER PUBLICATIONS

SAP Delivers Complete Solution for Product Life-Cycle Management With mySAP.com by Business Editors. Business Wire New York: Feb. 23, 2000. p. 1.*
Sadao Nakagawa, Planning of Improving Productivity by Reforming Parts Distribution, Factory Management, vol. 46, No. 5, pp. 43-47, Mar. 1, 2000.
Advertising Conference, Co., Software and System that Facilitate Drawing a Strategic Publishing Plan, Top Promotion Sales Promotion Conference, p. 86, Sep. 1, 2001.

* cited by examiner

*Primary Examiner*—Vanel Frenel
(74) *Attorney, Agent, or Firm*—Darby & Darby P.C.

(57) ABSTRACT

A centralized management system for managing maintenance parts of machines at multiple plants includes: a warehouse facility for providing a concentrated storage of the maintenance parts for multiple types of the machines at multiple plants; a necessary parts management device for managing whether the maintenance parts are required for the machine; and a parts shipment management device for determining the maintenance parts to be shipped from the warehouse facility based on management information in the necessary parts management device. The present invention provides a system for managing maintenance parts that allows management costs to be restricted while allowing changes in the status of machines at plants to be handled in a flexible manner.

4 Claims, 8 Drawing Sheets

CENTRALIZED MANAGEMENT SYSTEM FOR MAINTENANCE PARTS

FIELD OF INVENTION

The present invention relates to a system for managing maintenance parts for multiple types of machines located in multiple plants.

BACKGROUND OF THE INVENTION

Conventionally, a system for managing maintenance parts for multiple types of machines located in a plant has involved storing needed maintenance parts in the plant. When a maintenance part needs to be replaced due to a maintenance inspection of a machine or the like, the stored maintenance part is used for the machine, and an order is issued to replace the stored maintenance part that was used.

Thus, for an enterprise that operates multiple plants, maintenance parts are stored and managed independently within each plant, and maintenance parts are generally stocked so that there are no shortages in any of the plants.

Thus, the conventional organizational method may lead to shortages in maintenance parts and may lead to work delays in cases such as when there is a sudden increase in the number of maintenance parts needed as a consequence of a sudden rise in production volume. On the other hand, stocking large quantities of maintenance parts to be able to handle these types of changes in the environment increases maintenance costs. Furthermore, if more than one type of maintenance part is used in the plant, the maintenance costs are even greater.

OBJECT AND SUMMARY OF THE INVENTION

The object of the present invention is to overcome these problems and to be able to flexibly respond to changes in the status of machines located in different plants while keeping maintenance costs down.

The present invention provides a centralized maintenance parts management system that includes: a warehouse facility for storing, in a centralized manner, a maintenance part for a plurality of types of machines located at a plurality of plants; a necessary parts management device for managing whether the maintenance part is necessary or not for the machines; and a parts shipment management device for specifying a maintenance part to be shipped from the warehouse facility based on management information in the necessary parts management device.

More specifically, the maintenance parts for the multiple types of machines needed in the multiple plants are managed in a centralized manner in the warehouse facility. The maintenance parts are supplied based on information about an operation status of the machines in the plants or based on maintenance part supply requests. Thus, even if the total quantity of the maintenance parts stocked in the warehouse facility is kept at an appropriate level for the plants that the warehouse facility supplies, a change in the machines in one of the plurality of plants, e.g., a sudden increase in the number of maintenance parts needed, can be handled in a flexible manner because the total quantity of the stocked maintenance parts is high.

By managing the maintenance parts for the multiple types of machines in the multiple plants with the warehouse facility, it is possible to restrict the quantities of the stocked maintenance parts to an appropriate level while also keeping management costs down. Also, changes in the status of the machines in the plants can be handled in a flexible manner.

According to an embodiment of the present invention, there is also included an ordering management device for determining a maintenance part to be ordered and a quantity thereof based on inventory information of the maintenance part to be ordered in the warehouse facility or based on management information in the necessary parts management device.

Thus, the maintenance parts to be newly ordered and the quantity thereof can be determined automatically based on inventory information of the maintenance part to be ordered in the warehouse facility and/or information relating to whether the maintenance part to be ordered is needed for the machines in the plant being supplied. This makes the management of maintenance parts easier.

According to another embodiment of the present invention, the ordering management device is set up to allow input of a target value for a total price of the maintenance parts stored in the warehouse facility and, when determining a quantity of maintenance parts to be ordered, the quantity of maintenance parts to be ordered is reduced according to set conditions so that a total price of the maintenance parts stored in the warehouse facility approaches the target value.

There are many cases where maintenance part management costs are reduced by setting a target total price of the maintenance parts being stored.

In such cases, an order volume of the maintenance parts can be automatically controlled to approach this target value, thereby making maintenance part management easier.

According to another embodiment of the present invention, the ordering management device estimates a quantity of the maintenance parts that will be needed based on changes in quantities of the maintenance parts shipped out from the warehouse facility, changes in maintenance inspections of the machines, or changes in operating status of the machines and determines a maintenance part to be ordered and a quantity thereof.

Thus, when periodic inspections are simply repeated at fixed intervals, maintenance part management can involve simply ordering maintenance parts to compensate for the maintenance parts shipped out in response to the periodic inspection. However, there are many cases where the quantities of maintenance parts needed by the plants being supplied vary, e.g., due to changes in usage frequency of the machines.

In such cases, the quantity of maintenance parts that will be needed is estimated based on changes in quantities of the maintenance parts shipped out from the warehouse facility, changes in maintenance inspections of the machines, or changes in operating status of the machines, and the maintenance parts to be ordered and the quantities thereof are determined based on these changes, thereby allowing the system to respond appropriately to changes in the status of the machines at the plants.

According to another embodiment of the present invention, there is included an inspection period management device for storing information relating to periodic inspection periods for the machines and, when there is a new machine to be managed in one of the plants, the inspection period management device uses information relating to periodic inspection of existing machines to determine a periodic inspection period for the machine to be newly managed that is offset from the periodic inspection periods of existing machines.

When machines in a supplied plant are periodically inspected and the periodic inspection period is carried out in a concentrated manner over a short period of time, the shipping of maintenance parts needed for the periodic inspections from the warehouse facility becomes concentrated as well. Thus, a quick and efficient supply of maintenance parts can be difficult.

Therefore, information regarding the periodic inspection periods for the machines is managed in a centralized manner at the warehouse facility. If there is a new machine to be managed, the periodic inspection period for the new machine is set up so that the periodic inspection period for the new machine is offset from the periodic inspection periods for the existing machines. This inspection period for the new machine can then, for example, be recommended to the plant. This makes it possible to set up an environment where maintenance parts can be supplied in a quick and efficient manner.

According to another embodiment of the present invention, the necessary parts management device is set up to store and maintain plant-by-plant inventory information indicating quantities of the maintenance parts stored in the plurality of plants and uses the plant-by-plant inventory information in evaluating whether the maintenance part is necessary or not.

More specifically, some of the maintenance parts for the machines in the plants must be replaced quickly when the maintenance parts are needed. Even with centralized management at the warehouse facility of the maintenance parts, the types of maintenance parts that are needed immediately are usually not stocked at the individual plants.

When the warehouse facility is aware of the maintenance parts stocked at each plant, and when this awareness is reflected in the management of shipments of maintenance parts from the warehouse facility, it is possible to provide more appropriate maintenance part management.

According to another embodiment of the present invention, when a single machine needs a plurality of maintenance parts during a maintenance inspection, the parts shipment management device is set up to determine the maintenance parts to be shipped out successively as the maintenance inspection progresses.

If the machines in the plants are machines that require long periods of time for maintenance inspections, e.g., aircraft transported to a maintenance plant, sending necessary maintenance parts to plants in batches will result in plants accumulating maintenance parts that are not immediately needed.

By having the warehouse facility send maintenance parts to a plant successively as the maintenance inspection proceeds, excessive accumulation of maintenance parts at the plant can be prevented.

According to another embodiment of the present invention, the warehouse facility is an automated warehouse.

By storing the maintenance parts for the multiple types of machines at the multiple plants in an automated warehouse and providing centralized management, the necessary maintenance parts can be appropriately and quickly sent to the plants.

The automated warehouse referred to here is a warehouse facility equipped with a product storage section storing a product (e.g., maintenance parts in the present invention), a packaging section for the automated warehouse to receive and ship products, and a transporting device for automatically transporting the products between the two sections.

The above, and other objects, features and advantages of the present invention will become apparent from the following description read in conjunction with the accompanying drawings, in which like reference numerals designate the same elements.

LIST OF DESIGNATORS

MC: machine
MP: maintenance part
MT: inspection period management device
OC: order management device
PM: necessary parts management device
PR: parts shipment management device
SS: warehouse facility

DETAILED DESCRIPTION OF THE PREFERRED EMBODIMENTS

The embodiments of a centralized maintenance management system according to the present invention will be described using the figures.

Overall Structure

Figure 1:
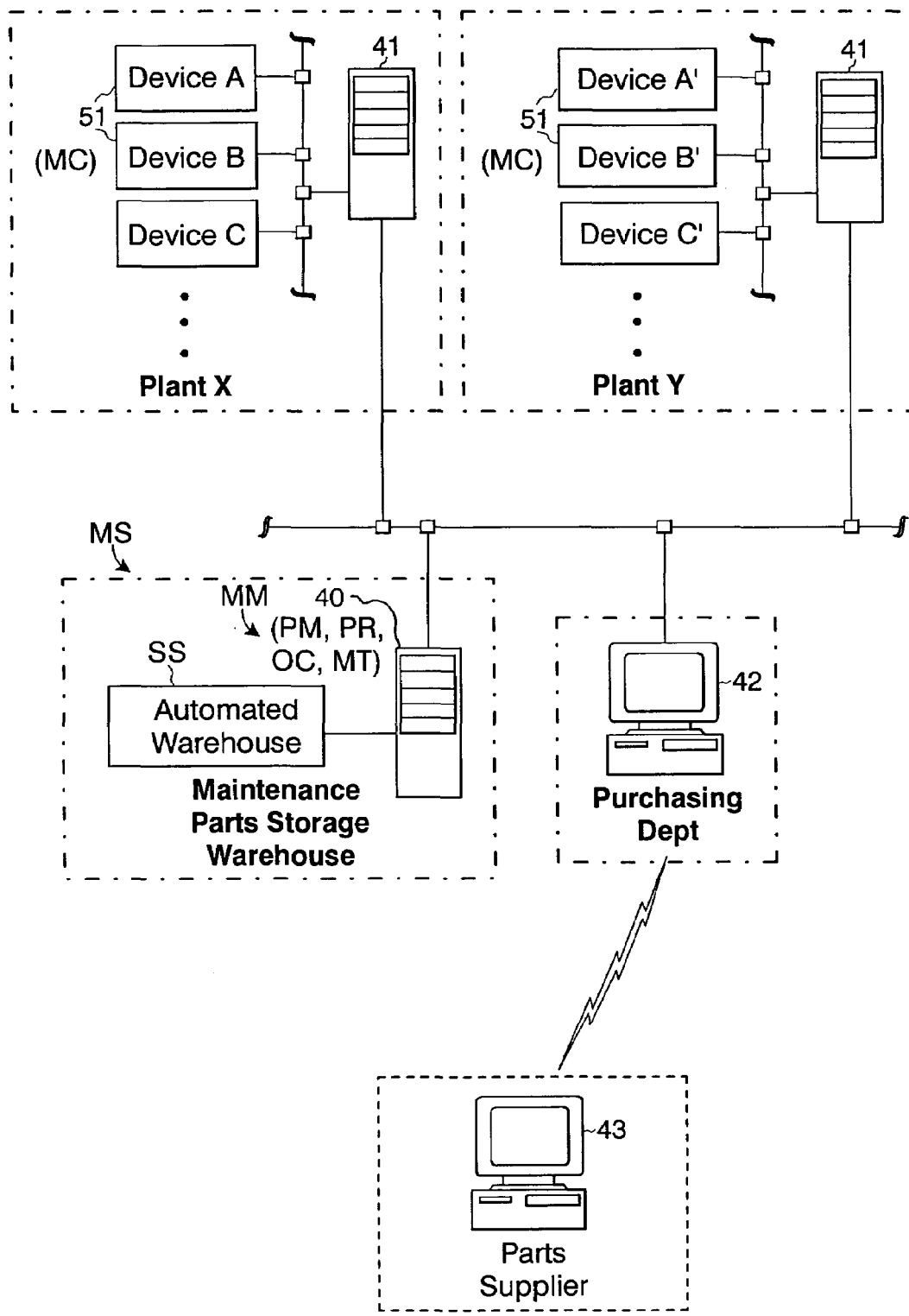
FIG. 1 is a drawing showing the overall architecture of a system according to an embodiment of the present invention.

A centralized maintenance part management system MM is a system for providing centralized management of maintenance parts for multiple types of machines in multiple plants. In the example used in the embodiment shown in FIG. 1, multiple types of devices 51, e.g., device A, device B, device C, device A', device B', device C', located in the two plants, plant X and plant Y, serve as the machines MC for which maintenance is to be performed. The devices 51 in plant X and plant Y are primarily manufacturing devices, but they also include testing devices and the like. The maintenance parts for the devices include maintenance parts shared by multiple types of devices 51 and maintenance parts that are specifically for particular devices.

A large portion of the replacement maintenance parts for the devices 51 are stored in a centralized manner in a maintenance part management warehouse MS. A warehouse facility SS set up at the maintenance parts management warehouse MS and a management server computer 40 managing shipping and receiving for the warehouse facility SS form the key elements of a maintenance parts centralized management system MM. In the example of this embodiment shown in FIG. 1, the warehouse facility SS is a so-called automated warehouse, and the warehouse facility SS will be referred to in the description below as the "automated warehouse SS".

Each plant stores maintenance parts, and waiting for shipment of the maintenance parts from the maintenance parts management warehouse MS has a major impact on the operation of the devices 51. The management server computer 40 stores inventory information, which is organized by plant, indicating quantities of maintenance parts stored in each plant. The quantities of maintenance parts stored in each plant are kept as small as possible in order to reduce maintenance costs and the like. Rather than having the number of stored maintenance parts be proportional to the number of the devices 51 that use the maintenance part, the number of stored maintenance parts for devices 51 is proportionally smaller when there are more devices 51.

Structure of the Automated Warehouse SS

Figure 4:
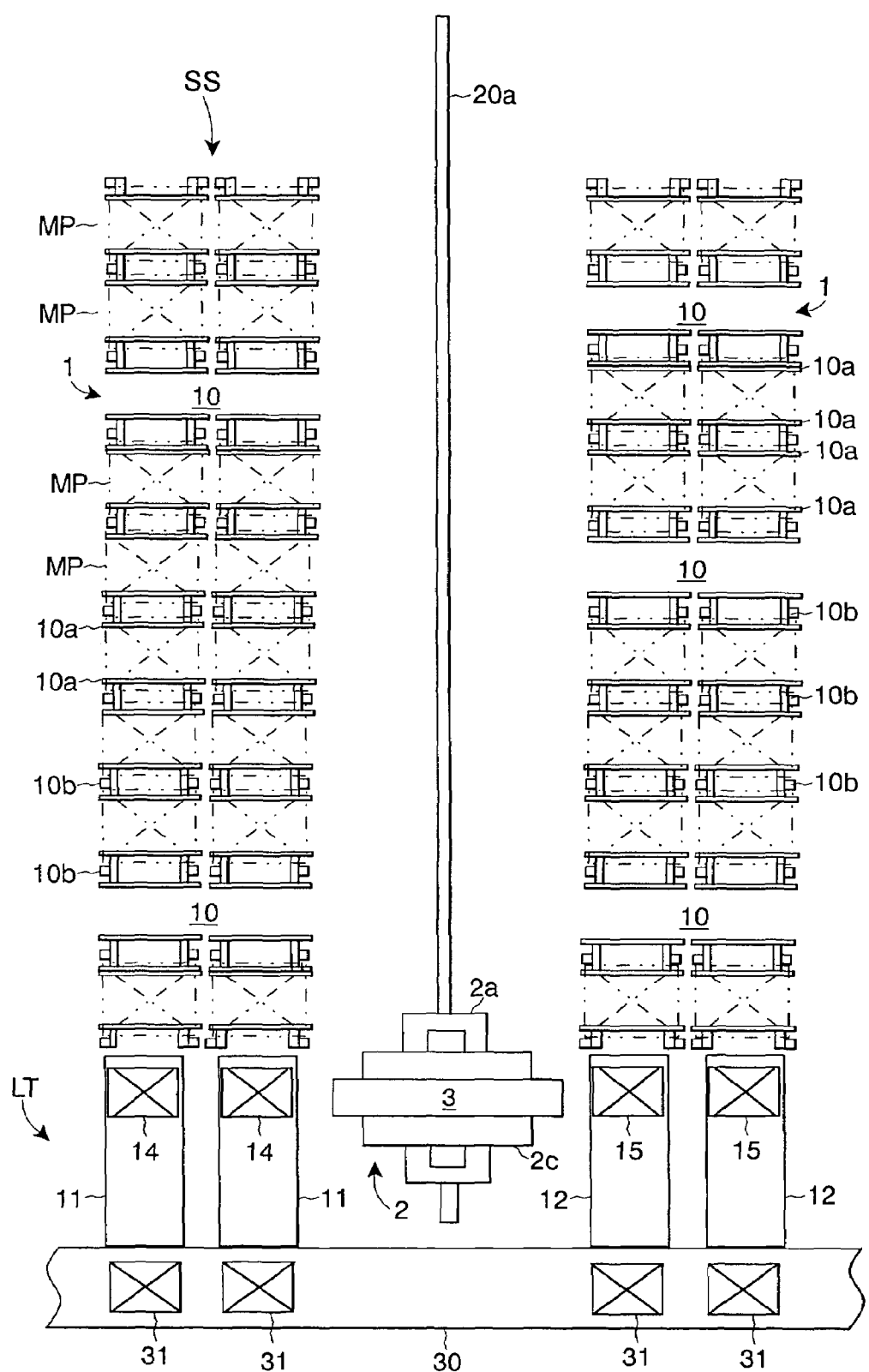
FIG. 4 is a plan view of an automated warehouse according to an embodiment of the present invention.

The automated warehouse SS of this embodiment stores various types of maintenance parts MP mounted on pallets. The plan drawing in FIG. 4 shows: storage shelves 1; a packaging section LT handling the maintenance parts MP that are received by or sent out from the storage shelf 1; and a stocker crane 2 serving as a transporting device that automatically transports objects between the packaging section LT and parts storage sections 10 of the storage shelves 1.

Figure 2:
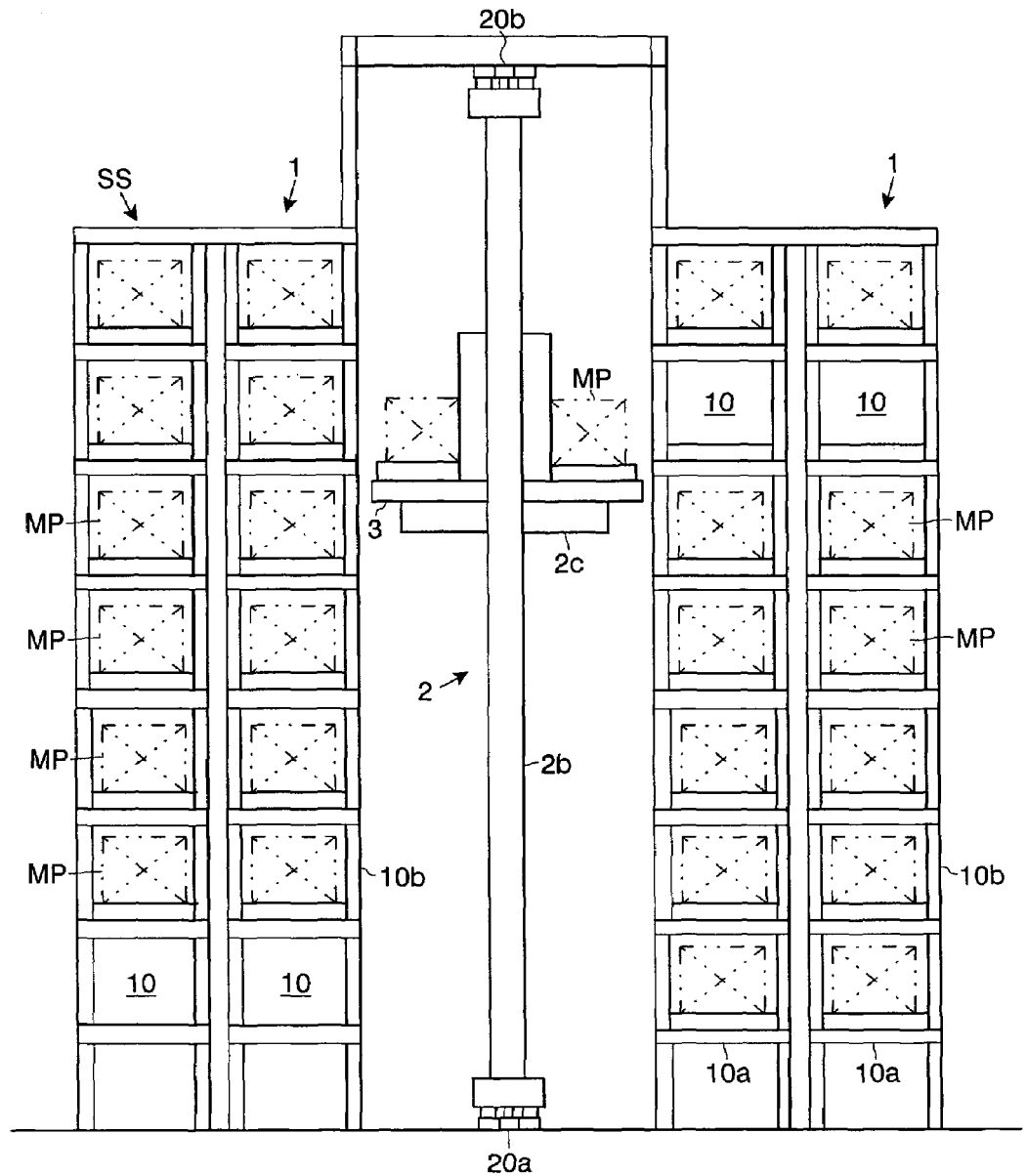
FIG. 2 is a side view of an automated warehouse according to an embodiment of the present invention.
Figure 3:
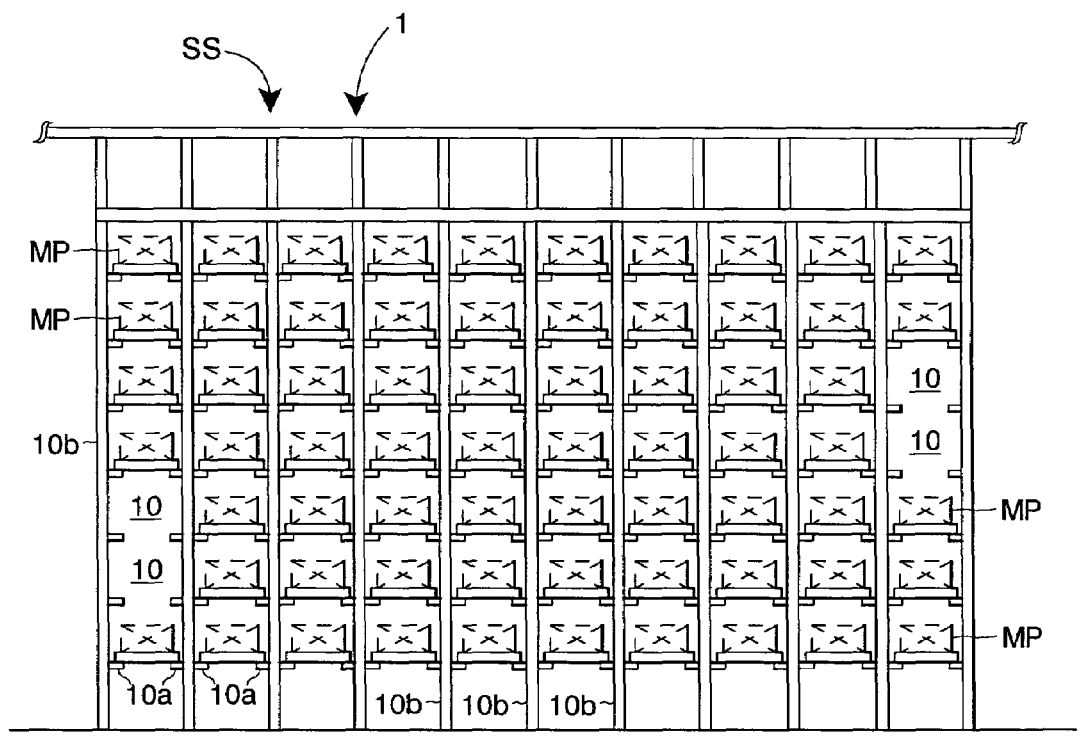
FIG. 3 is a front view of an automated warehouse according to an embodiment of the present invention.

The storage shelves 1 are arranged on either side of a movement path of the stacker crane 2, as shown in FIG. 2 and FIG. 3. On each storage shelf 1, the parts storage sections 10 are arranged, vertically and horizontally, and the parts storage sections 10 can hold two maintenance parts MP along the depth axis. Each of the parts storage sections 10 is formed by a pair of wooden arms 10a, which supports from below at the left and right a pallet, on which the maintenance part MP is mounted. The wooden arms 10a are attached to struts 10b via support members.

The packaging section LT includes: a shipping and receiving conveyor 30 for the maintenance parts MP which are to be shipped from and received by the automated warehouse SS; and a receiving conveyor 11 and a shipping conveyor 12 which branch off so that the conveyance directions of the receiving conveyor 11 and the shipping conveyor 12 are perpendicular to the shipping and receiving conveyor 30.

Both the receiving conveyor 11 and the shipping conveyor 12 are arranged in two rows so that the maintenance parts MP can be conveyed along the two rows. The intervals between the two rows are the same as the interval between maintenance part storage positions.

A lifter 14 is disposed at each conveyance row at the end of the receiving conveyor 11 toward the storage shelves 1. The lifter 14 lifts the maintenance part MP to move the maintenance part MP between the packaging section LT and a mounting device 3 of the stacker crane 2. Similarly a lifter 15 is disposed for each conveyance row of the shipping conveyor 12.

Elevator conveyors 31 are disposed at the connecting point of the receiving conveyor 11 and the shipping conveyor 12 with the shipping and receiving conveyor 30.

The stocker crane 2 includes a truck 2a running along a guide rail 20a on a floor side; a pair of struts 2b projected from the truck 2a; and a platform 2c that is vertically guided for raising and lowering by the struts 2b. The pair of struts 2b are connected at their upper ends, and the connecting section is guided by a guide rail 20b on a ceiling side.

The platform 2c includes a slide-fork type mounting device 3 that mounts the maintenance part MP between the parts storage sections 10. Two maintenance parts MP can be mounted along the mounting direction onto the mounting device 3. The stroke of the mounting device 3 is set up with a displacement adequate for positioning two maintenance parts MP to two maintenance part storage positions of the maintenance part storage sections 10.

Operations Performed by the Management Server Computer 40

The management server computer 40 is installed with a database server program and includes: a maintenance database, which monitors the operations of the devices 51 in the different plants and manages the supply of maintenance parts MP to the different plants; and a parts procurement database for ordering the maintenance parts MP from parts suppliers.

A device management computer 41, installed in each plant to access the management server computer 40, performs operations such as the collecting of data relating to an operation status of the devices 51 that are connected to a network.

The operations of the management server computer 40 will be described using the flowcharts in FIG. 5 through FIG. 8, which show the steps performed by the management server computer 40.

Figure 5:
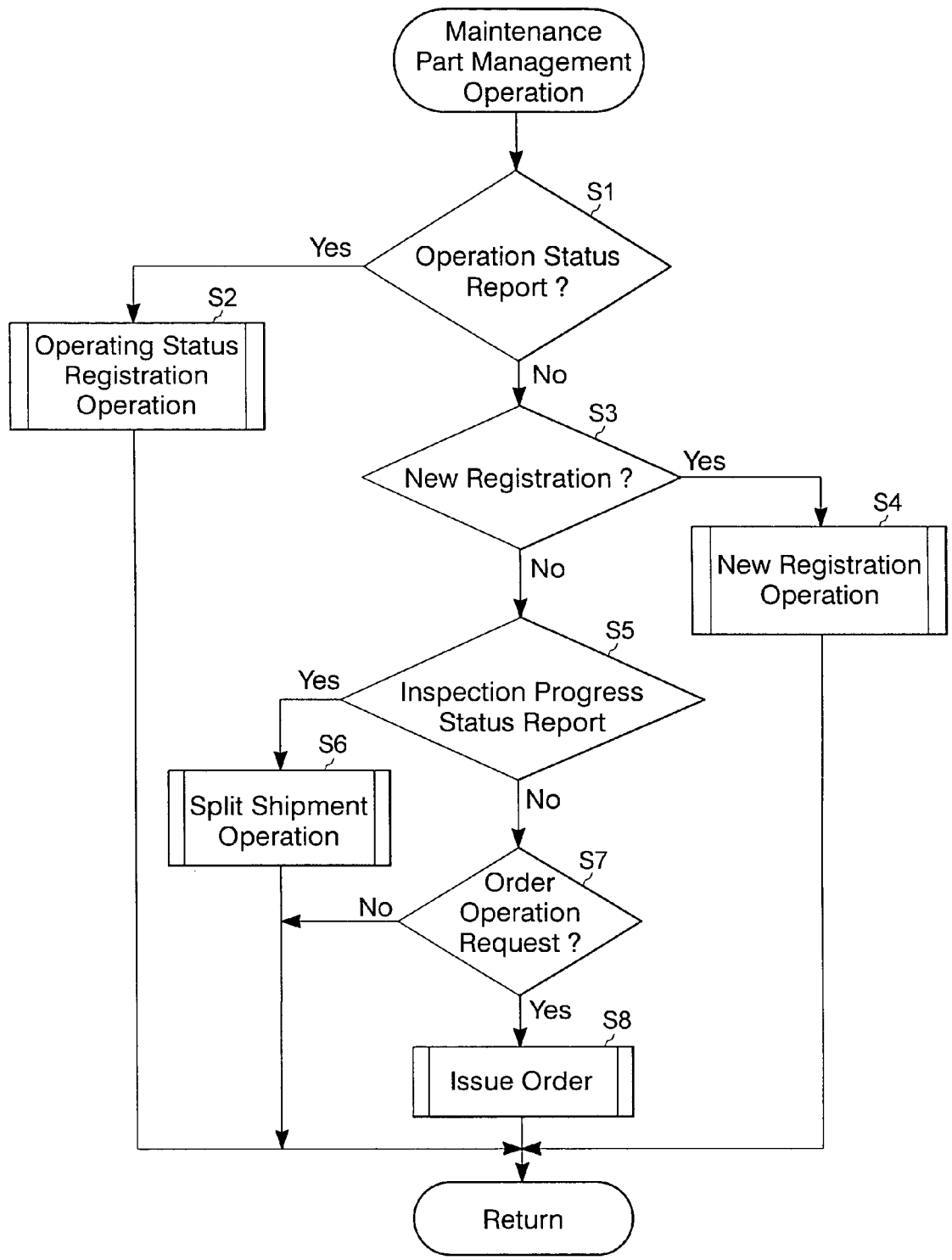
FIG. 5 is a flowchart of the maintenance part management operation according to an embodiment of the present invention.

The management server computer 40 executes the maintenance part management operation shown in FIG. 5 in response to a receive data request from Plant X or Plant Y or from a purchasing department computer 42 that handles the issuing of orders for the maintenance part MP.

If the receive data request is from the device management computer 41 of a plant, the data sent from the device management computer 41 of the plant is received, and the received data is checked to see if it is: data relating to the operation status of the devices 51 installed in the plant (step S1); registration data for a newly installed device 51 (step S3); or data relating to inspection progress status if the devices 51 are being inspected over a long period of time in the plant (step S5). If so, an operation status registration operation (step S2), a new registration operation (step S4), or a split shipment operation (step S6) is executed, respectively.

If data is received requesting operations to be performed by the computer 42 of the purchasing department to issue an order to the parts supplier for the maintenance part MP (step S7), an ordering operation is executed (step S8).

The reporting of the operation status of the devices 51 (step S1) can be performed, for example, by the device management computer 41 in the plant periodically, e.g., once a day. The operation status data primarily includes operating time data for each of the devices 51. Along with the operating status report, information about changes in the number of maintenance parts MP stored in each plant is sent.

Figure 6:
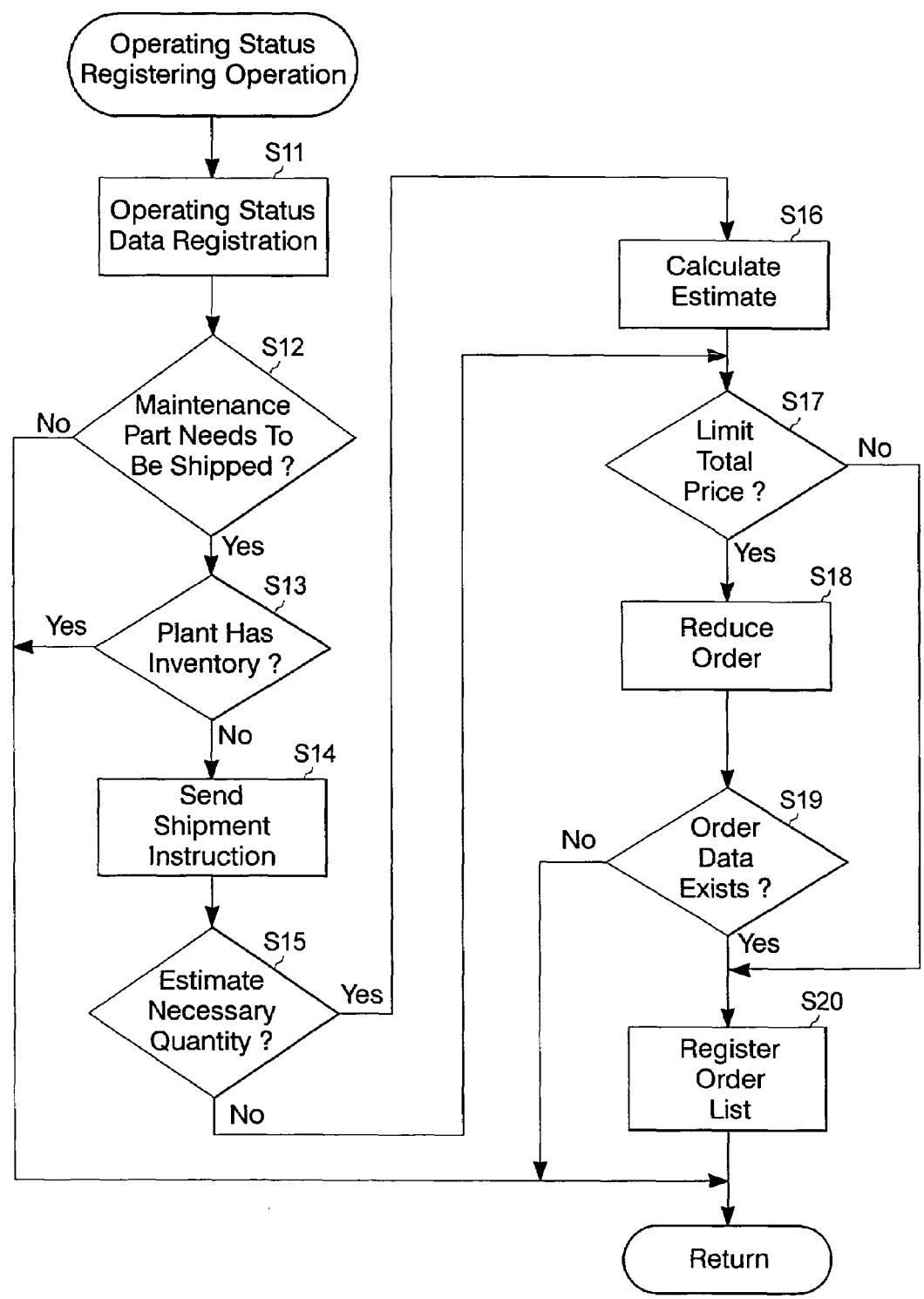
FIG. 6 is a flowchart of the operating status registering operation according to an embodiment of the present invention.

The operation status registration operation (step S2) executed when the operation status is reported is shown in the flowchart in FIG. 6. First, the received operation status data for the devices 51 are registered in a maintenance database (step S1 ). This maintenance database also stores the quantities of the maintenance part MP stored at the plant. When changes in the quantities of the maintenance part MP stored at each plant are reported along with the operation status report, this information is used to update the data stored in the maintenance database.

Next, an evaluation is made as to whether a shipment from the automated warehouse SS is needed to replace the maintenance part MP for a device 51 based on whether or not the accumulated operation time of the device 51 has reached a set time for parts replacement (step S12). If the maintenance part MP needs to be shipped from the automated warehouse SS for one of the devices 51, a further evaluation is made as to whether the plant is stocked with the necessary quantity of that type of maintenance part MP, based on the inventory-by-plant information for the maintenance part MP stored in the maintenance database (step S13). If the maintenance part MP is not in the plant's inventory or if the quantity is insufficient, an instruction is issued to a controller of the automated warehouse SS to ship the necessary quantity of the maintenance part MP, and the shipment quantity and the shipment data are registered in the maintenance database (step S14).

With this instruction, the automated warehouse SS activates the stacker crane 2, the shipping conveyer 12, and the like and ships the maintenance part MP to the corresponding plant using shipping means such as a truck.

Thus, the maintenance server computer 40 functions as a necessary parts management device PM for managing information about whether the maintenance part MP is needed for the machine MC and also for functioning as a parts shipment management device PR that specifies the maintenance parts MP to be shipped from the automated warehouse SS based on management information of the necessary parts management device PM.

The inventory of the maintenance part MP in the automated warehouse SS declines due to the shipment of the maintenance part MP. To compensate for this reduction, the maintenance part MP that should be ordered and the quantity to order are registered in the parts procurement database (step S20).

With regard to the ordering of the maintenance part MP, the management server computer 40 can be set to a necessary quantity estimating mode, in which the quantity of the maintenance part MP is raised or lowered by estimating the future quantity of the maintenance part MP that is needed when ordering. The management server computer 40 can also be set to a total price restricting mode, in which the total price of the maintenance part MP stored in the automated warehouse SS is limited to a target price.

If the necessary quantity estimating mode is active (step S15), the necessary quantity of the maintenance part MP is predicted by carrying out an approximation function on the change in inventory quantity over a fixed period in the maintenance database for the maintenance part MP. The order quantity is increased or reduced based on this prediction value (step S16).

When the total price restriction mode described above is active and the target total price has been entered using a keyboard or the like of the management server computer 40 (step S17), the order quantity for the maintenance part MP is reduced based on condition settings so that the total price of the maintenance part MP stored in the automated warehouse SS approaches the target value (step S18). The condition settings for this reduction of the order quantity for the maintenance part MP can be determined by a reduction method such as by setting a minimum necessary quantity for each maintenance part MP, with the order quantity of the maintenance parts MP being set to "0" if the quantity of the maintenance part MP in the inventory exceeds the minimum necessary quantity. Alternatively, priorities can be assigned to the different maintenance parts MP, with order quantity reductions being increased for maintenance parts MP having low priorities.

With the operation in step S18, if the quantity of the maintenance part MP to be ordered is greater than "0" (step S19), the order quantity is registered in the parts procurement database (step S20).

Based on the data registered in the parts procurement database accumulated in this manner, when the management server computer 40 receives from the purchasing department computer 42 data indicating a request for performing processing to issue an order to the supplier of the maintenance part MP (step S7 in FIG. 5), the maintenance part MP that needs to be ordered and the quantity thereof are output as a list to the purchasing department computer 42. Thus, an order issuing operation is executed (step S8 in FIG. 5). In the purchasing division, the order data for the maintenance part MP is sent to a computer 43 of the associated parts supplier, and the order is placed for the maintenance part MP.

When an order for the maintenance part is issued and the maintenance part MP that is shipped by the parts supplier is received at the automated warehouse SS, information regarding these actions is registered in the parts procurement database, and the maintenance part inventory quantity in the maintenance database is updated.

Thus, the management server computer 40 functions as an order management device OC that determines the maintenance part MP and the quantity to be ordered based on the management information in the necessary parts management device PM.

Next, the new registration operation (step S4) mentioned above will be described.

Figure 7:
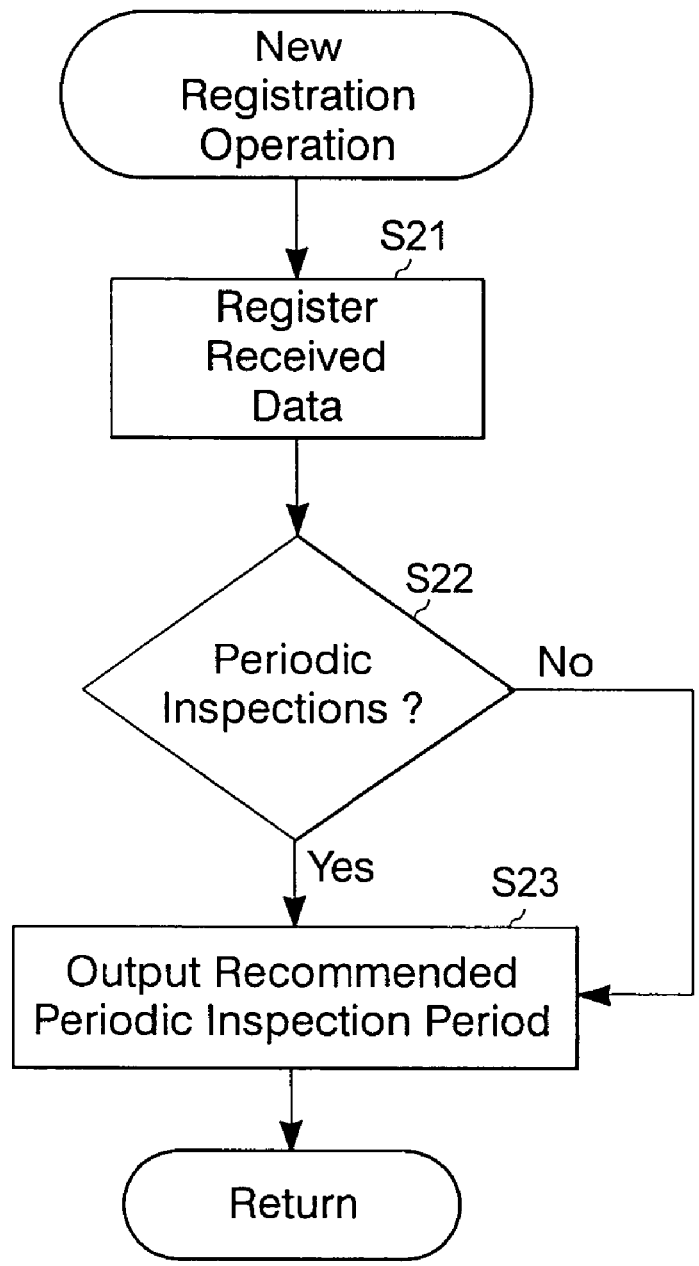
FIG. 7 is a flowchart of the split shipment operation according to an embodiment of the present invention.

The new registration operation in step S4 of FIG. 5 is shown in the flowchart in FIG. 7. First, the new registration data received from the device management computer 41 at the plant is registered in the maintenance database (step S21).

The new registration data normally includes a list of maintenance parts MP needed by the newly installed device 51 and operating time data at which each maintenance part MP should be replaced. The new registration data also includes information about periodic inspection intervals, if periodic inspections of the device 51 are needed. Other information may be included in the new registration data, such as information indicating the start of maintenance inspection operations, if maintenance inspection for the device 51 requires a long interval, and data indicating the relationship between the maintenance parts MP and the progress level of the maintenance inspection operation.

If the new registration data includes data indicating the need for periodic inspection data for the device 51 and the interval for the periodical inspections (step S22), a search is performed on the periodic inspection period information for the devices 51 that are registered in the maintenance database as requiring periodic inspections. A recommended periodic inspection period that is offset from the periodic inspection periods that have already been registered is output to the device management computer 41 (step S23).

Then, on the plant side, an assessment is made as to whether the periodic inspection period posted from the management server computer 40 is possible or not, and a period as close to the recommended periodic inspection period is registered in the maintenance database of the management server computer 40.

Thus, the management server computer 40 functions as an inspection period management device MT that manages the periodic inspection periods of the devices 51 that need periodic inspections and that are located in the different plants.

Next, the split shipment operation (step S6) will be described. The split shipment operation is performed if the data received from the plant's device management computer 41 is related to a progress status of an inspection when a device 51 is being inspected over a long period of time in a plant (step S5).

Figure 8:
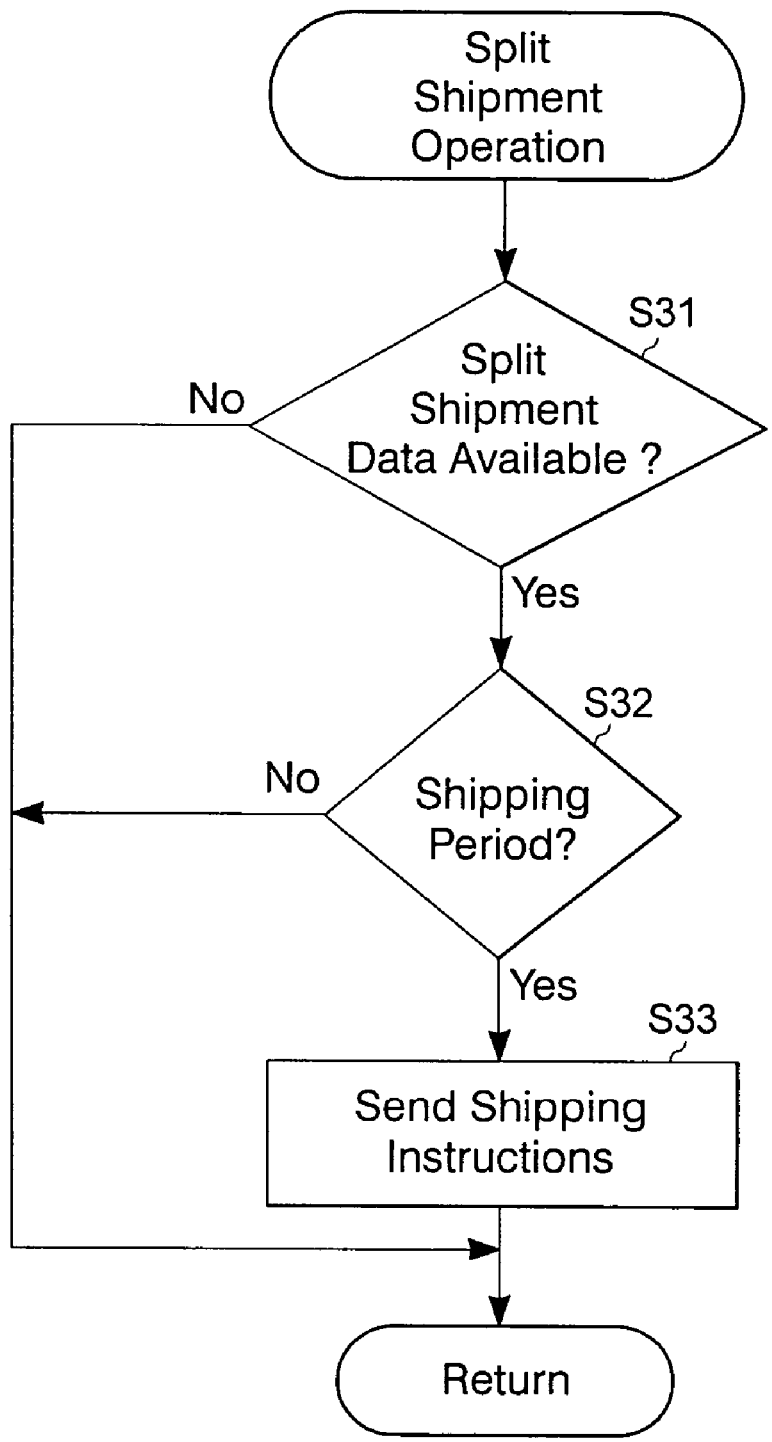
FIG. 8 is a flowchart of the new registration operation according to an embodiment of the present invention.

The operations performed in this split shipment operation are shown in the flowchart in FIG. 8. The maintenance database is checked to see that it has registered data relating to the maintenance inspection for which a progress status report has been received (step S31). Using data in the maintenance database about the relationship between progress levels of the maintenance inspection and maintenance parts MP that become necessary (the data registered in the new registration operation), an evaluation is made as to whether the received maintenance inspection progress level is a progress level for which the maintenance part MP should be shipped (step S32).

If a progress level for which the maintenance part MP should be shipped has been reached, the controller of the automated warehouse SS is instructed to ship the corresponding maintenance part MP (step S33).

ALTERNATIVE EMBODIMENT

Alternative embodiments of the present invention will be described.

(1) In the embodiment described above, the functions of the necessary parts management device PM, the parts shipment management device PR, an order management device OC, and the inspection period management device MT are all part of the management server computer 40. However, each of the functions of these devices can be provided by separate computers. Alternatively, the management server computer 40 can be formed from multiple computers by clustering.

(2) In the embodiment described above, the automated warehouse is a three-dimensional automated warehouse in which the parts storage sections 10 are arranged in vertical and horizontal rows. However, it would also be possible to use various other types of automated warehouses instead, e.g., warehouses where items are laid out in a flat arrangement.

Furthermore, the present invention can also be used in cases where the warehouse facility SS is not an automated warehouse but is a warehouse with standard shelves, e.g., fixed shelves, or a warehouse where items are laid out flat.

(3) In the embodiment described above, when determining the maintenance part to be ordered by the order management device OC and the quantity thereof, this information is determined based on the shipment information of the parts shipment management device PR. However, it would also be possible to determine the maintenance part to be ordered and the quantity thereof independent from the shipping operation of the maintenance part and based instead on inventory information (inventory quantity) of the maintenance part MP in the automated warehouse SS.

(4) In the embodiment described above, when the quantity of maintenance parts MP needed for the future is to be estimated, the estimate is made based on changes in the quantity of the maintenance part MP shipped from the automated warehouse SS. However, it would also be possible to have information about maintenance inspections conducted on machines entered at the plant so that the quantity of the maintenance parts MP that will be needed in the future can be estimated from the changes in the number of maintenance inspections conducted over a fixed period. Alternatively, the quantity of the maintenance parts MP that will be needed in the future can be estimated independent from the shipping operations for the maintenance part by using the changes in the operation status of the devices 51 (changes in the device operation rates).

(5) In the embodiment described above, production devices and the like are multiple types of machines in the plants. However, the present invention can be used when the machines are aircraft or automobiles and the plants are maintenance plants.

(6) In the embodiment described above, the order management device OC outputs data for ordering the maintenance part MP as a list, and based on this list, the purchasing department orders the maintenance part MP. However, the order management device OC can be set up to directly issue orders to the computer 43 of the parts supplier.

With another embodiment of the present invention, maintenance parts for multiple types of machines at multiple plants are stored in a centralized manner in a warehouse facility. This allows the stock of maintenance parts to be limited to an appropriate quantity, allows management costs to be kept down, and allows flexible responses to changes in the status of machines at the plants.

With an embodiment of the present invention, at least one of the inventory information for the maintenance part in the warehouse facility and information about whether or not the maintenance part is required in a machine at a plant supplied by the warehouse is used to automatically determine the maintenance part to be newly ordered and the quantity thereof. This simplifies the management of the maintenance parts.

A target value for the total price of maintenance parts being stored is often used as a way to reduce management costs for the maintenance parts. With another embodiment of the present invention, the order volume for the maintenance parts is automatically controlled so that the target value is approached. This simplifies management of maintenance parts.

To manage the maintenance parts, the quantity of the maintenance parts needed by the plants often changes due to reasons such as a change in a usage frequency of the machines. With another embodiment of the present invention, the maintenance parts to be ordered and the quantity thereof are determined by estimating the number of maintenance parts that will be needed based on changes in the number of maintenance parts shipped from the warehouse facility, changes in the number of inspections of the machines, or changes in the operating status of the machines. As a result, appropriate responses can be made to changes in the operating status of machines in the plants being supplied.

When the machines in the supplied plants are inspected periodically and the periodic inspections periods are concentrated in a short period of time, the shipping operations from the warehouse facility for maintenance parts needed for the periodic inspections becomes concentrated, thereby a quick and reliable supply of the maintenance parts difficult. With another embodiment of the present invention, the warehouse facility provides centralized management of information regarding periodic inspection periods for the machines. When a new machine is to be managed, a period is determined for periodic inspections for the new machine that is offset from the periodic inspection periods of the other machines, and this determined period is recommended to the plant. This provides an environment where the maintenance parts can be supplied quickly and efficiently.

Among the maintenance parts for the machines at the plants, there are ones that need to be replaced quickly when they are needed. Even if maintenance parts are managed in a centralized manner by a warehouse facility, individual plants often do not have these emergency maintenance parts in stock. With another embodiment of the present invention, the warehouse facility keeps track of the maintenance parts stocked at each plant and this information is reflected in the handling of shipping of the maintenance parts from the warehouse facility.

If the machines in the plants require long maintenance inspection periods, as in aircraft transported to a maintenance plant, sending the necessary maintenance parts in batches leads to the accumulation of maintenance parts that will not be needed immediately. With another embodiment of the present invention, the supplying of maintenance parts from the warehouse facility to the plant is performed successively as the maintenance inspection proceeds at the plant. This prevents excessive accumulation of maintenance parts at the plant.

According to another embodiment of the present invention, the maintenance parts for multiple types of machines at multiple plants are stored in an automated warehouse and managed in a centralized manner. This allows necessary maintenance parts to be supplied to the plants quickly and reliably.

What is claimed is:

1. A maintenance part central control system comprising:
a warehouse facility where maintenance parts for a plurality of types of machinery that are present in a plurality of plants are centrally stocked;
a necessary-parts control apparatus that controls requirement conditions for said maintenance parts of said machinery and provides control information;
a parts shipping control apparatus that specifies said maintenance parts to be shipped from said warehouse facility based on the control information of said necessary-parts control apparatus; and
an order control apparatus that specifies the maintenance parts and quantities thereof to be ordered based on storage information about said maintenance parts in said warehouse facility, or based on the control information of said necessary-parts control apparatus;
wherein said order management apparatus is configured such that the maintenance parts and quantities thereof to be ordered are specified by estimating a necessary quantity of said maintenance parts based on fluctuations of the quantity of said maintenance parts shipped from said warehouse facility, on fluctuations of maintenance inspection frequency of said machinery, or on fluctuations of operational status of said machinery; and
said order management apparatus is configured to be able to set and input a target value of a total price of said maintenance parts to be stocked at said warehouse facility, and is configured such that, when specifying the quantity of said maintenance parts to be ordered, the quantity of said maintenance parts to be ordered decreases as the total price of said maintenance parts stocked in said warehouse facility approaches said target value based on set conditions; and
said necessary parts control apparatus is configured such that stock information classified by plant indicating the quantities of said maintenance parts that are stocked in said multiple plants is stored in memory, and is configured such that said stock information classified by plant is used in determining said maintenance part requirement conditions.

2. The maintenance part central control system of claim 1, further comprising an inspection period management apparatus that memorizes periodic inspection time information of said machinery, and that, when machinery is newly targeted for control at any plant, specifies a periodic inspection time of the machinery newly targeted for control in a manner staggered with a periodic inspection time of existing machinery based on the periodic inspection time information of the existing machinery.

3. The maintenance part central control system of claim 1, wherein said parts shipping control apparatus is configured such that when multiple maintenance parts are necessary for a maintenance inspection of a machine, said maintenance parts that should be shipped are specified sequentially as said maintenance inspections progress based on data indicating a relationship between the necessary maintenance parts and previously memorized maintenance inspection progress levels.

4. The maintenance part central control system of claim 1, wherein said warehouse facility comprises an automated warehouse.

* * * * *